(12) United States Patent
Tajima et al.

(10) Patent No.: US 12,113,395 B2
(45) Date of Patent: Oct. 8, 2024

(54) POWER CONVERTER

(71) Applicant: TMEIC Corporation, Chuo-ku (JP)

(72) Inventors: Hidenobu Tajima, Chuo-ku (JP);
Masamichi Kano, Chuo-ku (JP)

(73) Assignee: TMEIC Corporation, Chuo-ku (JP)

( * ) Notice: Subject to any disclaimer, the term of this patent is extended or adjusted under 35 U.S.C. 154(b) by 74 days.

(21) Appl. No.: 17/774,122

(22) PCT Filed: Jun. 15, 2020

(86) PCT No.: PCT/JP2020/023411
§ 371 (c)(1),
(2) Date: May 3, 2022

(87) PCT Pub. No.: WO2021/255788
PCT Pub. Date: Dec. 23, 2021

(65) Prior Publication Data
US 2022/0399746 A1 Dec. 15, 2022

(51) Int. Cl.
*H02J 9/06* (2006.01)
*H02J 7/02* (2016.01)
*H02M 7/217* (2006.01)
*H02M 7/537* (2006.01)

(52) U.S. Cl.
CPC .............. *H02J 9/062* (2013.01); *H02J 7/02* (2013.01); *H02M 7/217* (2013.01); *H02M 7/537* (2013.01); *H02J 2207/20* (2020.01)

(58) Field of Classification Search
CPC .......... H02J 9/062; H02J 7/02; H02J 2207/20; H02M 7/217; H02M 7/537
USPC ..................................... 307/20, 64
See application file for complete search history.

(56) References Cited

U.S. PATENT DOCUMENTS

| | | | |
|---|---|---|---|
| 8,339,093 B2 | 12/2012 | Lu et al. | |
| 2017/0244277 A1* | 8/2017 | Blair | H02H 7/125 |
| 2020/0256926 A1* | 8/2020 | Umezawa | G01R 31/42 |
| 2021/0044142 A1* | 2/2021 | Oki | H02H 3/16 |

(Continued)

FOREIGN PATENT DOCUMENTS

JP 2019-180131 A 10/2019

OTHER PUBLICATIONS

International Search Report mailed on Aug. 25, 2020 in PCT/JP2020/023411 filed on Jun. 15, 2020 (2 pages).

*Primary Examiner* — Michael R. Fin
(74) *Attorney, Agent, or Firm* — Oblon, McClelland, Maier & Neustadt, L.L.P.

(57) ABSTRACT

An uninterruptible power supply apparatus includes: an electromagnetic contactor including a first terminal that receives a first AC voltage supplied from an AC power supply and a second terminal connected to an AC node; a capacitor that is connected to a DC line and stores DC power; a converter that transmits and receives electric power between the AC node and the DC line; and a controller. In an activation mode, the controller turns on the electromagnetic contactor after controlling the converter such that a frequency and a phase of a second AC voltage supplied from the converter to the AC node match a frequency and a phase of the first AC voltage. In a normal operation mode after the activation mode, the controller controls the converter such that a DC voltage of the DC node attains to a reference voltage.

5 Claims, 5 Drawing Sheets

(56) References Cited

U.S. PATENT DOCUMENTS

2022/0216726 A1\* 7/2022 Kamalasadan ....... H02J 7/0063
2022/0224149 A1\* 7/2022 Colombi ................ H02J 9/061

\* cited by examiner

POWER CONVERTER

TECHNICAL FIELD

The present invention relates to power converters, and particularly, to a power converter including a switch connected between an alternate-current (AC) power supply and a conversion unit.

BACKGROUND ART

For example, Japanese Patent Laying-Open No. 2019-180131 (PTL 1) discloses a power converter including a switch having a first terminal that receives an AC voltage supplied from an AC power supply and is turned on in normal operation, a conversion unit that is connected to a second terminal of the switch and converts the AC voltage supplied from the AC power supply through the switch into a direct-current (DC) voltage, and a capacitor that smooths the DC voltage output from the conversion unit.

CITATION LIST

Patent Literature

PTL 1: Japanese Patent Laying-Open No. 2019-180131

SUMMARY OF INVENTION

Technical Problem

In the power converter disclosed in PTL 1, however, an overcurrent may flow from the AC power supply through the switch to the conversion unit when the switch is turned on, resulting in damage to the switch due to the overcurrent.

A main object of the present invention is therefore to provide a power converter that is able to prevent damage to a switch between an AC power supply and a conversion unit.

Solution to Problem

A power converter according to the present invention includes: a switch having a first terminal that receives a first AC voltage supplied from an AC power supply and a second terminal connected to an AC node; a capacitor that is connected to a DC node and stores DC power; a conversion unit that transmits and receives electric power between the AC node and the DC node; and a controller. In a first mode, the controller turns on the switch after controlling the conversion unit such that a frequency and a phase of a second AC voltage supplied from the conversion unit to the AC node match a frequency and a phase of the first AC voltage. In a second mode after the first mode, the controller controls the conversion unit such that a DC voltage supplied from the conversion unit to the DC node attains to a reference voltage.

Advantageous Effects of Invention

In the power converter according to the present invention, the switch is turned on after the conversion unit is controlled such that the frequency and the phase of the second AC voltage supplied from the conversion unit to the AC node match the frequency and the phase of the first AC voltage. The switch is thus turned on after the voltage between the first terminal and the second terminal of the switch is decreased, reducing a current flowing through the switch, which prevents damage to the switch.

DESCRIPTION OF EMBODIMENTS

Figure 1:
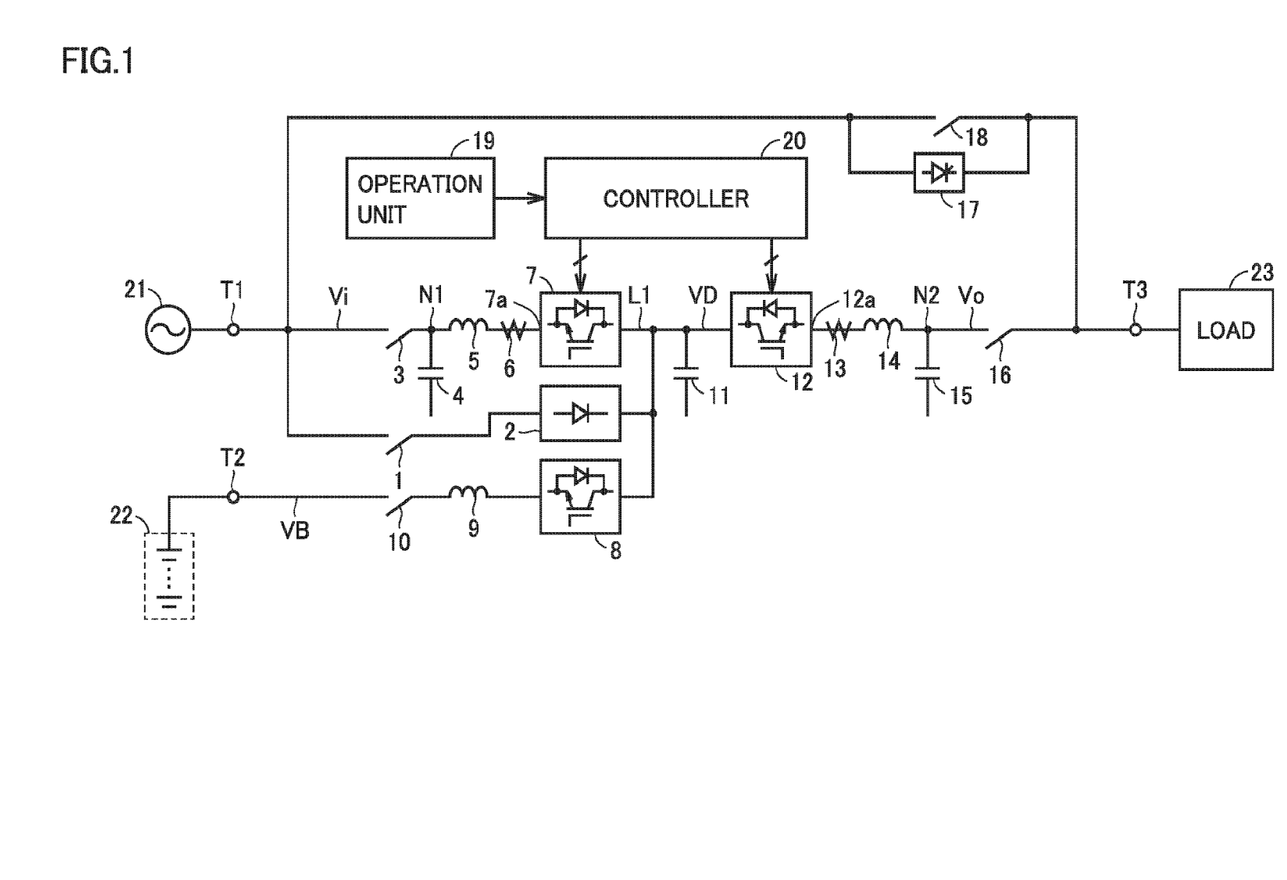
FIG. 1 is a circuit block diagram showing a configuration of an uninterruptible power supply apparatus according to an embodiment.

FIG. 1 is a circuit block diagram showing a configuration of an uninterruptible power supply apparatus according to an embodiment. The uninterruptible power supply apparatus temporarily converts three-phase AC power supplied from a commercial AC power supply 21 into DC power, converts the DC power into three-phase AC power, and supplies the three-phase AC power to a load 23. For simplification of the drawings and description, FIG. 1 shows only a circuit of a portion corresponding to one phase of three phases.

In FIG. 1, the uninterruptible power supply apparatus includes an AC input terminal T1, a battery terminal T2, and an AC output terminal T3. AC input terminal T1 receives AC power of commercial frequency from commercial AC power supply 21. Battery terminal T2 is connected to a battery (power storage device) 22. Battery 22 stores DC power. A capacitor may be connected in place of battery 22. AC output terminal T3 is connected to load 23. Load 23 is driven by AC power.

The uninterruptible power supply apparatus further includes electromagnetic contactors 1, 3, 10, 16, 18, a preliminary charger 2, capacitors 4, 11, 15, reactors 5, 9, 14, current detectors 6, 13, a converter 7, a DC line L1, a bidirectional chopper 8, an inverter 12, a semiconductor switch 17, an operation unit 19, and a controller 20.

Electromagnetic contactor 1 has a first terminal connected to AC input terminal T1 and a second terminal connected through preliminary charger 2 to DC line L1. Capacitor 11 is connected to DC line L1 and smooths a DC voltage VD of DC line L1. Electromagnetic contactor 1 is controlled by controller 20, and is turned on in preliminary charge and turned off after preliminary charge.

Preliminary charger 2 includes a plurality of diodes. Preliminary charger 2 subjects AC power supplied from commercial AC power supply 21 through electromagnetic contactor 1 to full-wave rectification to generate DC power, and supplies the DC power to DC line L1 to charge capacitor 11.

An instantaneous value of DC voltage VD which appears in DC line L1 is detected by controller 20. Controller 20 turns on electromagnetic contactor 1 when the uninterruptible power supply apparatus is powered on and turns off electromagnetic contactor 1 when DC voltage VD exceeds a prescribed preliminary charge voltage VDP.

Electromagnetic contactor 3 (switch) has a first terminal connected to AC input terminal T1 and a second terminal (AC node N1) connected through reactor 5 to an AC node 7a of converter 7. Electromagnetic contactor 3 is controlled by controller 20, and is turned on after preliminary charge of capacitor 11 is complete and converter 7 is activated. Electromagnetic contactor 3 is kept to be turned on in normal operation mode of the uninterruptible power supply apparatus and is turned off in power failure in which AC voltage Vi is not supplied normally from commercial AC power supply 21 and in maintenance of the uninterruptible power supply apparatus.

An instantaneous value of an AC input voltage Vi which appears at AC input terminal T1 is detected by controller 20. For example, the presence or absence of a power failure is determined based on the instantaneous value of AC input voltage Vi. Current detector 6 detects an AC input current Ii flowing through reactor 5 and supplies a signal Iif indicative of a detection value to controller 20.

Capacitor 4 is connected to node N1. Capacitor 4 and reactor 5 constitute a low-pass filter and pass AC power of commercial frequency to prevent a signal of switching frequency generated in converter 7 from passing to commercial AC power supply 21. In other words, capacitor 4 and reactor 5 convert an AC voltage of commercial frequency output from AC node 7a of converter 7 into a sinusoidal AC voltage VAF and outputs AC voltage VAF to AC node N1.

Converter 7 includes a plurality of insulated gate bipolar transistors (IGBTs) and a plurality of diodes, each of which is connected in antiparallel with a corresponding one of the plurality of IGBTs. Each of the plurality of IGBTs is controlled by controller 20 to be turned on and off. Each of the plurality of IGBTs can be turned on and off at prescribed timing to convert an AC voltage into a DC voltage or convert a DC voltage into an AC voltage.

In an activation mode (first mode) after preliminary charge of capacitor 11 is complete, converter 7 converts DC voltage VD of DC line L1 into an AC voltage of commercial frequency and outputs the AC voltage to AC node 7a. In the activation mode, controller 20 controls converter 7 such that the frequency and phase of AC voltage VAF supplied from converter 7 to AC node N1 match the frequency and phase of AC voltage Vi from commercial AC power supply 21.

Controller 20 turns on electromagnetic contactor 3 after a lapse of a prescribed period of time from start of the activation mode. On this occasion, since the frequency and phase of AC voltage VAF which appears at AC node N1 match the frequency and phase of AC voltage Vi from commercial AC power supply 21, a current flowing through electromagnetic contactor 3 can be reduced, thus preventing damage to electromagnetic contactor 3.

As electromagnetic contactor 3 is turned on, controller 20 executes a normal operation mode (second mode). In the normal operation mode, converter 7 converts AC power supplied from commercial AC power supply 21 through electromagnetic contactor 3 into DC power and outputs the DC power to DC line L1. A DC voltage output from converter 7 is controllable to a desired value. Capacitor 4, reactor 5, and converter 7 constitute a conversion unit that transmits and receives electric power between AC node N1 and DC line L1 (DC node).

In the normal operation mode, controller 20 controls converter 7 such that DC voltage VD of DC line L1 attains to a reference voltage VDr. In power failure in which AC voltage Vi is no longer supplied normally from commercial AC power supply 21, the operation of converter 7 is stopped, and electromagnetic contactor 3 is turned off.

DC line L1 is connected to a high-voltage node of bidirectional chopper 8, and a low-voltage node of bidirectional chopper 8 is connected through reactor 9 and electromagnetic contactor 10 to battery terminal T2. Reactor 9 smooths a current flowing between bidirectional chopper 8 and battery 22.

Electromagnetic contactor 10 is controlled by controller 20 to be turned on in use of the uninterruptible power supply apparatus and turned off in, for example, maintenance of the uninterruptible power supply apparatus and battery 22. An instantaneous value of a voltage between terminals VB of battery 22 which appears at battery terminal T2 is detected by controller 20.

Bidirectional chopper 8 includes a plurality of IGBTs and a plurality of diodes, each of which is connected in antiparallel with a corresponding one of the plurality of IGBTs. Each of the plurality of IGBTs is controlled by controller 20 to be turned on and off. Each of the plurality of IGBTs is turned on and off at prescribed timing, thus allowing DC power to be transmitted and received between DC line L1 and battery 22.

Bidirectional chopper 8 stores part of DC power generated by converter 7 in battery 22 in the normal operation mode and supplies DC power of battery 22 to inverter 12 through DC line L1 in power failure of commercial AC power supply 21.

In storing of DC power in battery 22, bidirectional chopper 8 steps down DC voltage VD of DC line L1 and supplies DC voltage VD to battery 22. When supplying DC power of battery 22 to inverter 12, bidirectional chopper 8 boosts voltage between terminals VB of battery 22 and outputs voltage between terminals VB to DC line L1.

In storing of DC power in battery 22, controller 20 controls bidirectional chopper 8 such that voltage between terminals VB of battery 22 attains to a reference voltage VBr. When supplying DC power from battery 22 to inverter 12, controller 20 controls bidirectional chopper 8 such that DC voltage VD of DC line L1 attains to reference voltage VDr. DC line L1 is connected to the DC node of inverter 12.

Inverter 12 includes a plurality of IGBTs and a plurality of diodes, each of which is connected in antiparallel with a corresponding one of the plurality of IGBTs. Each of the plurality of IGBTs is controlled by controller 20 to be turned on and off. Each of the plurality of IGBTs is turned on and off at prescribed timing, thus allowing conversion of DC voltage VD into AC voltage.

Inverter 12 is controlled by controller 20 to convert DC power supplied from converter 7 or bidirectional chopper 8 through DC line L1 into AC power of commercial frequency. Specifically, inverter 12 converts DC power supplied from converter 7 through DC line L1 into AC power in the normal operation mode and converts DC power supplied from battery 22 through bidirectional chopper 8 into AC power in power failure.

An AC node 12a of inverter 12 is connected to a first terminal of reactor 14, and a second terminal (output node N2) of reactor 14 is connected through electromagnetic contactor 16 to AC output terminal T3. Capacitor 15 is connected to output node N2.

Current detector 13 detects an instantaneous value of an output current Io of inverter 12 and supplies a signal Iof indicative of a detection value to controller 20. An instantaneous value of an AC output voltage Vo which appears at output node N2 is detected by controller 20.

Reactor 14 and capacitor 15 constitute a low-pass filter and pass AC power of commercial frequency generated in inverter 12 to an AC output terminal T3 to prevent a signal of switching frequency generated in inverter 12 from passing to AC output terminal T3. In other words, reactor 14 and capacitor 15 convert an AC voltage of commercial frequency output from AC node 12a of inverter 12 into sinusoidal AC voltage Vo and output AC voltage Vo to output node N2.

Inverter 12, reactor 14, and capacitor 15 constitute an inversion unit that transmits and receives electric power between DC line L1 and output node N2. Controller 20 controls inverter 12 such that the frequency and phase of AC voltage Vo supplied from inverter 12 to output node N2 match the frequency and phase of AC voltage Vi from commercial AC power supply 21.

Electromagnetic contactor 16 is controlled by controller 20 to be turned on when AC power generated by inverter 12 is supplied to load 23 (in an inverter feeding mode) and turned off when AC power supplied from commercial AC power supply 21 through electromagnetic contactor 18 is supplied to load 23 (in a bypass feeding mode). Electromagnetic contactor 16 is turned off in failure of inverter 12.

Semiconductor switch 17 includes a thyristor and is connected between AC input terminal T1 and AC output terminal T3. Electromagnetic contactor 18 is connected in parallel with semiconductor switch 17. Semiconductor switch 17 is controlled by controller 20 to be turned off in normal operation and be instantaneously turned on and supplies AC power from commercial AC power supply 21 to load 23 in failure of inverter 12. Semiconductor switch 17 is turned off after a lapse of a prescribed period of time from turn-on.

Electromagnetic contactor 18 is turned off when AC power generated by inverter 12 is supplied to load 23 (in the inverter feeding mode) and is turned on when AC power from commercial AC power supply 21 is supplied to load 23 (in the bypass feeding mode).

In failure of inverter 12, electromagnetic contactor 18 is turned on and supplies AC power from commercial AC power supply 21 to load 23. In other words, in failure of inverter 12, semiconductor switch 17 is instantaneously turned on for a prescribed period of time, and electromagnetic contactor 18 is turned on. This is for preventing damage to semiconductor switch 17 due to overheating.

Operation unit 19 includes a plurality of buttons operated by a user of the uninterruptible power supply apparatus, an image display on which various pieces of information are displayed, and/or the like. As the user operates operation unit 19, the uninterruptible power supply apparatus can be powered on and off, or any one mode of the bypass feeding mode and the inverter feeding mode can be selected.

Controller 20 controls the entire uninterruptible power supply apparatus based on a signal from operation unit 19, AC input voltage Vi, AC input current Ii, DC voltage VD, battery voltage VB, AC output current Io, AC output voltage Vo, and/or the like.

Figure 2:
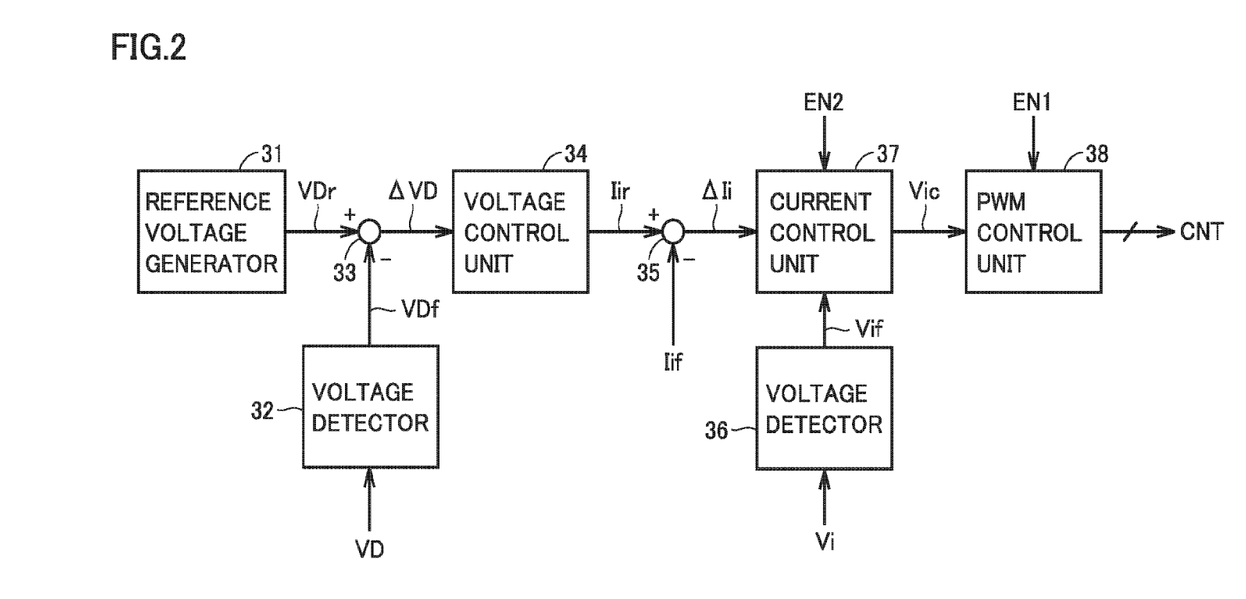
FIG. 2 is a block diagram showing a configuration of a portion of a controller shown in FIG. 1, which relates to control of a converter.

FIG. 2 is a block diagram showing a configuration of a portion of controller 20 shown in FIG. 1 which relates to control of converter 7. In FIG. 2, controller 20 includes a reference voltage generator 31, voltage detectors 32, 36, subtractors 33, 35, a voltage control unit 34, a current control unit 37, and a pulse width modulation (PWM) control unit 38.

Reference voltage generator 31 outputs reference voltage VDr. Reference voltage VDr is set to a rated voltage of DC voltage VD. Voltage detector 32 detects an instantaneous value of DC voltage VD of DC line L1 and outputs a signal VDf indicative of a detection value. Subtractor 33 obtains a deviation $\Delta$VD between reference voltage VDr and DC voltage VD indicated by output signal VDf of voltage detector 32. Voltage control unit 34 adds up a value proportional to deviation $\Delta$VD and an integrated value of deviation $\Delta$VD, thereby generating a current command value Iir.

Subtractor 35 obtains a deviation $\Delta$Ii between current command value Iir and input current Ii indicated by output signal Iif of current detector 6 (FIG. 1). Voltage detector 36 detects an instantaneous value of AC voltage Vi supplied from commercial AC power supply 21 and outputs a signal Vif indicative of a detection value.

When signal EN2 is at "H" level, which is an activation level, current control unit 37 adds up a value proportional to deviation $\Delta$Ii and an integrated value of deviation $\Delta$Ii, thereby generating a voltage command value Vic. Voltage command value Vic is a sinusoidal signal of the same frequency as that of AC voltage Vi. A phase difference between voltage command value Vic and AC voltage Vi varies according to deviation $\Delta$Ii.

When signal EN2 is at "L" level, which is a deactivation level, current control unit 37 generates voltage command value Vic having the same frequency and phase as those of AC voltage Vi indicated by output signal Vif of voltage detector 36.

When signal EN1 is at "H" level which is the activation level, PWM control unit 38 generates a control signal CNT for controlling converter 7 based on voltage command value Vic. Control signal CNT includes a plurality of gate signals supplied to gates of the plurality of IGBTs included in converter 7. When signal EN1 is at "L" level which is the deactivation level, PWM control unit 38 brings the plurality of gate signals included in control signal CNT to "L" level, and the operation of converter 7 is stopped.

An operation of controller 20 shown in FIG. 2 will now be described. In preliminary charge, signal EN1 is brought to "L" level, and PWM control unit 38 is deactivated, thereby stopping the operation of converter 7.

In the activation mode, signal EN1 is brought to "H" level, and PWM control unit 38 is activated, thereby starting the operation of converter 7. Also, signal EN2 is brought to "L" level, and current control unit 37 generates voltage command value Vic having the same frequency and phase as those of AC voltage Vi supplied from commercial AC power supply 21.

Thus, converter 7 is controlled such that the frequency and phase of AC voltage VAF supplied from converter 7 to AC node N1 are equal to the frequency and phase of AC voltage Vi supplied from commercial AC power supply 21.

In the normal operation mode, signal EN1 is kept at "H" level, and PWM control unit 38 is activated, thus continuing the operation of converter 7. Also, signal EN2 is brought to "H" level, and current control unit 37 generates voltage command value Vic having the same frequency as that of AC voltage Vi and having a phase corresponding to deviation $\Delta$Ii.

When DC voltage VD is lower than reference voltage VDr, thus, deviations $\Delta$VD, $\Delta$Ii have positive values, and the phase of voltage command value Vic lags behind the phase of AC voltage Vi. The phase of AC voltage VAF thus lags behind the phase of AC voltage Vi, and electric power flows from commercial AC power supply 21 through converter 7 to capacitor 11, increasing DC voltage VD.

When DC voltage VD is higher than reference voltage VDr, deviations $\Delta$VD, $\Delta$Ii have negative values, and the phase of voltage command value Vic leads the phase of AC voltage Vi. The phase of AC voltage VAF thus leads the phase of AC voltage Vi, and electric power flows from capacitor 11 through converter 7 to commercial AC power supply 21, reducing DC voltage VD. DC voltage VD is thus kept at reference voltage VDr.

Figure 3:
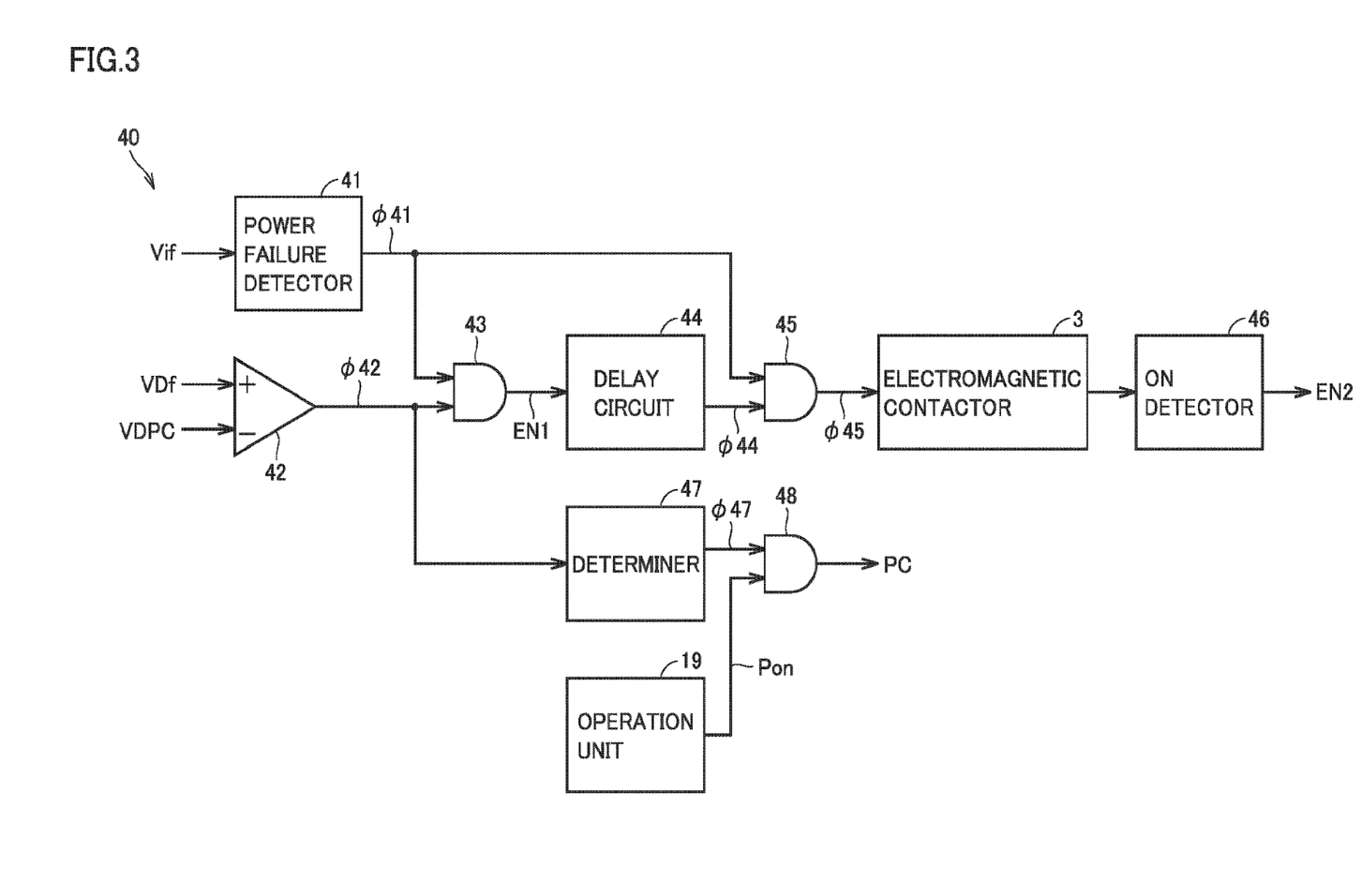
FIG. 3 is a circuit block diagram showing a configuration of a signal generation circuit that generates signals EN1, EN2 shown in FIG. 2.

FIG. 3 is a circuit block diagram showing a configuration of signal generation circuit 40 that generates signals EN1, EN2 shown in FIG. 2. In FIG. 3, signal generation circuit 40 includes a power failure detector 41, a comparator 42, AND gates 43, 45, 48, a delay circuit 44, an ON detector 46, and a determiner 47.

Power failure detector 41 detects whether a power failure has occurred in commercial AC power supply 21 (FIG. 1) based on AC voltage Vi indicated by output signal Vif of voltage detector 36 (FIG. 2), and outputs a signal ϕ41 indicative of a detection result.

For example, when AC voltage Vi is lower than a lower limit voltage VL, power failure detector 41 determines that a power failure has occurred in commercial AC power supply 21 and brings signal ϕ41 to "L" level. When AC voltage Vi is higher than lower limit voltage VL, power failure detector 41 determines that no power failure has occurred in commercial AC power supply 21 and brings signal ϕ41 to "H" level.

Comparator 42 compares the magnitude between DC voltage VD indicated by output signal VDf of voltage detector 32 (FIG. 2) and a prescribed preliminary charge voltage VDPC and outputs a signal ϕ42 indicative of a comparison result. When DC voltage VD is lower than preliminary charge voltage VDPC, signal ϕ42 is brought to "L" level. When DC voltage VD is higher than preliminary charge voltage VDPC, signal ϕ42 is brought to "H" level.

AND gate 43 outputs a logical AND signal of signals ϕ41, ϕ42 as signal EN1 (FIG. 2). Specifically, when no power failure has occurred in commercial AC power supply 21 and DC voltage VD is higher than preliminary charge voltage VDPC, signal EN1 is brought to "H" level, and PWM control unit 38 outputs control signal CNT, thereby activating converter 7. When a power failure has occurred in commercial AC power supply 21, signal EN1 is brought to "L" level, and generation of control signal CNT by PWM control unit 38 is stopped, thereby stopping the operation of converter 7.

Delay circuit 44 raises signal ϕ44 from "L" level to "H" level after a lapse of a prescribed period of time Tc from a rise of signal EN1 from "L" level to "H" level. Prescribed period of time Tc is set to a time necessary and sufficient for the frequency and phase of AC voltage VAF supplied from converter 7 to AC node N1 in the activation mode to match the frequency and phase of AC voltage Vi supplied from commercial AC power supply 21.

AND gate 45 outputs a logical AND signal of signals ϕ41, ϕ44 as a signal ϕ45. When signal ϕ45 is at "L" level, electromagnetic contactor 3 is turned off. When signal ϕ45 is at "H" level, electromagnetic contactor 3 is turned on.

That is to say, when no power failure has occurred in commercial AC power supply 21 and prescribed period of time Tc elapses from activation of converter 7, electromagnetic contactor 3 is turned on. When a power failure occurs in commercial AC power supply 21, signal ϕ45 is brought to "L" level, and electromagnetic contactor 3 is turned off, so that commercial AC power supply 21 and converter 7 are electrically separated from each other.

ON detector 46 detects whether electromagnetic contactor 3 is turned on, and outputs signal EN2 (FIG. 2) indicative of a detection result. When electromagnetic contactor 3 is turned off, signal EN2 is brought to "L" level. Electromagnetic contactor 3 includes a main contact that flows a main current and an auxiliary contact which is turned on/off together with the main contact. ON detector 46 detects whether electromagnetic contactor 3 (i.e., main contact) is turned on, based on whether the auxiliary contact of electromagnetic contactor 3 is turned on. In other words, converter 7 is controlled such that when electromagnetic contactor 3 is turned on, current control unit 37 (FIG. 2) is activated to cause DC voltage VD to attain to reference voltage VDr.

Determiner 47 determines whether output signal ϕ42 of comparator 42 has been kept at "H" level for a prescribed period of time Th (e.g., three seconds) and outputs a signal ϕ47 indicative of a determination result. When signal ϕ42 has not been kept at "H" level for prescribed period of time Th, signal ϕ47 is brought to "H" level. When signal ϕ42 has been kept at "H" level for prescribed period of time Th, signal ϕ47 is brought to "L" level.

AND gate 48 outputs a logical AND signal of output signal ϕ47 of determiner 47 and a signal Pon from operation unit 19 as a signal PC. Signal Pon is a signal which is raised from "L" level to "H" level when a power-on switch of operation unit 19 is turned on. When signal PC is at "L" level, electromagnetic contactor 1 (FIG. 1) is turned off. When signal PC is at "H" level, electromagnetic contactor 1 is turned on.

That is to say, when the power-on switch of operation unit 19 is turned on, signals Pon, PC are brought to "H" level to turn on electromagnetic contactor 1, so that preliminary charger 2 starts charging capacitor 11. When DC voltage VD is kept higher than preliminary charge voltage VDPC for prescribed period of time Th, signal PC is brought to "L" level to turn off electromagnetic contactor 1, so that preliminary charge of capacitor 11 is stopped.

Figure 4:
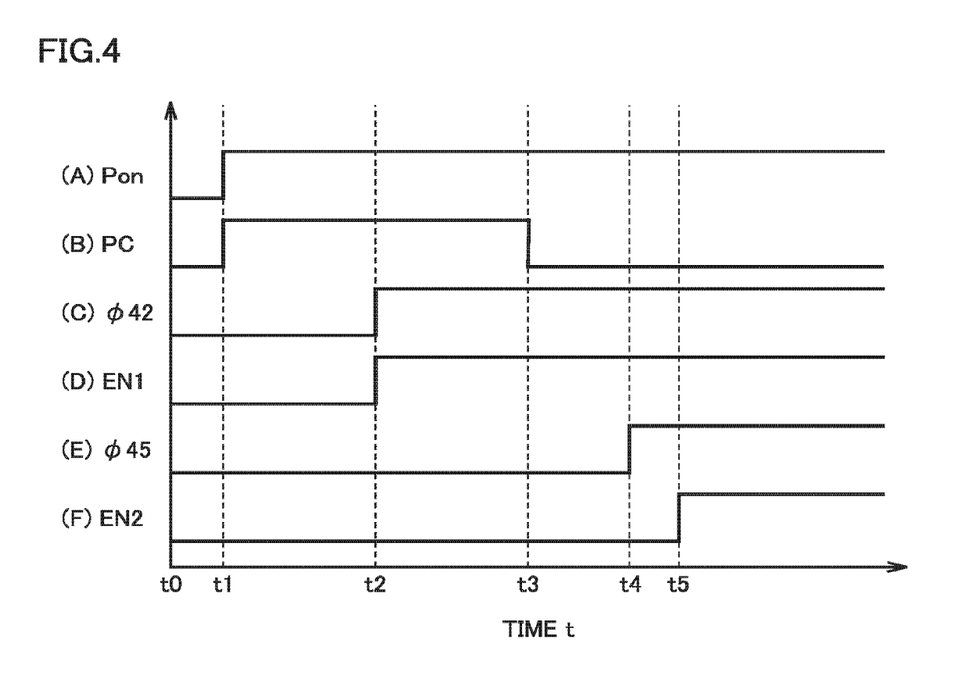
FIG. 4 is a time chart showing an operation of the uninterruptible power supply apparatus shown in FIGS. 1 to 3.

Next, an operation of the uninterruptible power supply apparatus will be described. FIG. 4 is a time chart showing an operation of the uninterruptible power supply apparatus. In FIG. 4, (A) shows a waveform of signal Pon, (B) shows a waveform of signal PC, (C) shows a waveform of output signal ϕ42 of comparator 42, (D) shows a waveform of signal EN1, (E) shows output signal ϕ45 of AND gate 45, and (F) shows a waveform of signal EN2.

In the initial state (time t0), all of signals Pon, PC, ϕ42, EN1, ϕ45, EN2 are at "L" level, semiconductor switch 17 and electromagnetic contactors 1, 3, 18 are turned off, and electromagnetic contactors 10, 16 are turned on. AC voltage Vi is normally supplied from commercial AC power supply 21, and output signal ϕ41 of power failure detector 41 (FIG. 3) is at "H" level. Battery 22 is charged to reference voltage VBr in advance.

At a time t1, the user of the uninterruptible power supply apparatus operates operation unit 19 (FIGS. 1 and 3) to power on the uninterruptible power supply apparatus. When power is on, operation unit 19 brings signal Pon to "H" level, so that output signal PC (FIG. 3) of AND gate 48 (FIG. 3) is brought to "H" level.

When signal PC is brought to "H" level, electromagnetic contactor 1 is turned on, and AC power is supplied from commercial AC power supply 21 through electromagnetic contactor 1 to preliminary charger 2. The AC power is converted into DC power by preliminary charger 2, and the DC power is supplied to DC line L1 (FIG. 1). Capacitor 11 is accordingly charged to increase DC voltage VD.

When DC voltage VD exceeds preliminary charge voltage VDPC, output signal ϕ42 of comparator 42 (FIG. 3) is raised to "H" level, and output signal EN1 of AND gate 43 is raised to "H" level. When signal EN1 is brought to "H" level, PWM control unit 38 (FIG. 2) generates control signal CNT, so that converter 7 is activated.

On this occasion, since signal EN2 (FIG. 3) is at "L" level, current control unit 37 outputs voltage command value Vic having the same frequency and phase as those of AC voltage Vi. PWM control unit 38 thus generates control signal CNT such that the frequency and phase of AC voltage VAF supplied from converter 7 to AC node N1 match the frequency and phase of AC voltage Vi supplied from commercial AC power supply 21, thereby controlling converter 7.

When output signal φ42 of comparator 42 is kept at "H" level for prescribed period of time Th, determiner 47 lowers signal φ47 to "L" level, thus lowering signal PC to "L" level (time t3). When signal PC is brought to "L" level, electromagnetic contactor 1 is turned off to stop supply of AC power to preliminary charger 2, so that preliminary charge of capacitor 11 is stopped.

At a time t4 after a lapse of a delay time Tc of delay circuit 44 from bringing signal EN1 to "H" level, output signal φ45 of AND gate 45 is raised to "H" level. When signal φ45 is brought to "H" level, electromagnetic contactor 3 (FIGS. 1 and 3) is turned on.

On this occasion, since the frequency and phase of AC voltage VAF supplied from converter 7 to AC node N1 match the frequency and phase of AC voltage Vi supplied from commercial AC power supply 21, a current flowing through electromagnetic contactor 3 is reduced to a small value, thus preventing damage to electromagnetic contactor 3.

Figure 5:
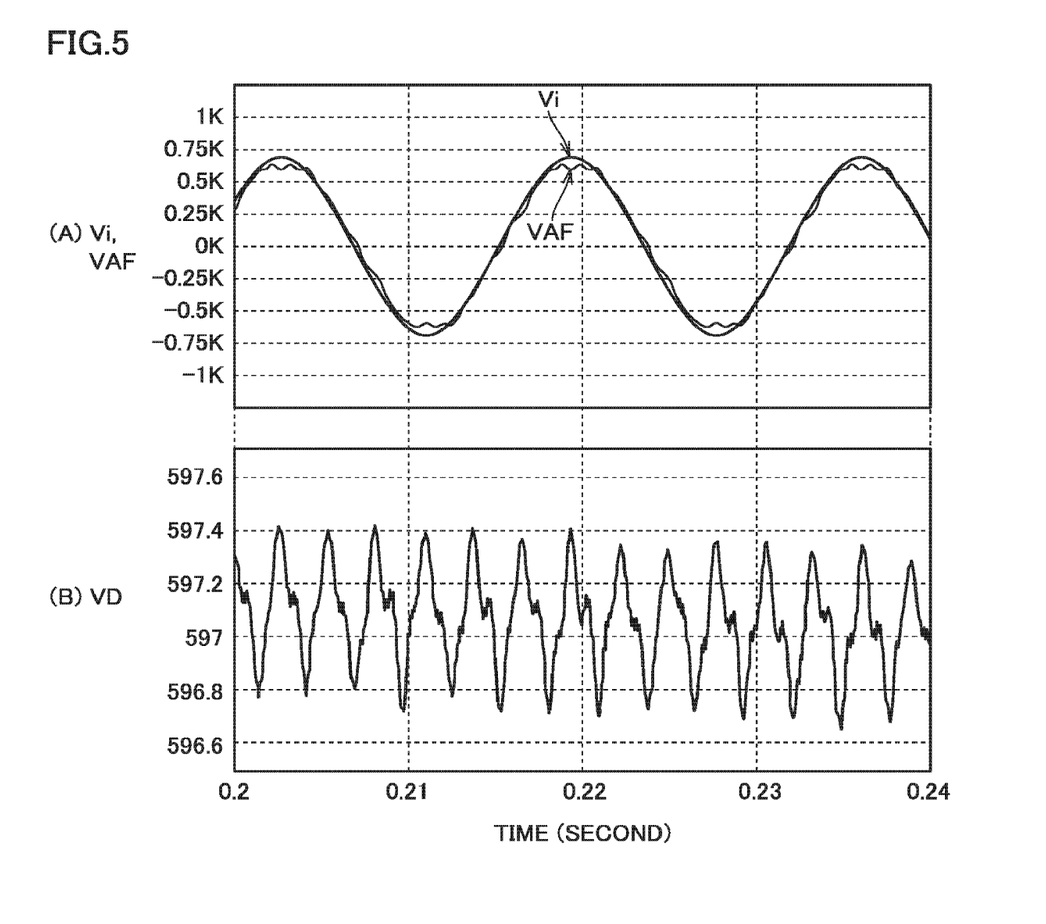
FIG. 5 is a time chart for illustrating an effect of the invention of the present application.

FIG. 5 is a time chart showing waveforms of AC voltages Vi, VAF and DC voltage VD. In FIG. 5, (A) shows the waveforms of AC voltages Vi, VAF, and (B) shows the waveform of DC voltage VD. As shown in FIG. 5(B), DC voltage VD in preliminary charge was approximately 597 V. Since a three-phase AC voltage supplied from commercial AC power supply 21 is subjected to full-wave rectification in actuality, DC voltage VD includes a ripple voltage of a frequency three times that of AC voltage Vi.

As shown in FIG. 5(A), the frequency and phase of AC voltage VAF match the frequency and phase of AC voltage Vi. Although AC voltage VAF has an amplitude lower than the amplitude (approximately 700 V) of AC voltage Vi, a difference between the amplitudes of AC voltages Vi, VAF is not greater than 100 V.

Conventionally, electromagnetic contactor 3 has been turned on with AC voltage VAF at 0 V, and accordingly, a large current might have flowed through electromagnetic contactor 3 to damage electromagnetic contactor 3. Contrastingly, in the present embodiment, electromagnetic contactor 3 is turned on after the generation of AC voltage VAF having the same frequency and phase as those of AC voltage Vi. This can reduce a current flowing through electromagnetic contactor 3, thus preventing damage to electromagnetic contactor 3.

Referring again to FIG. 4, when electromagnetic contactor 3 is turned on, output signal EN2 of ON detector 46 is brought to "H" level (time t5). When signal EN2 is brought to "H" level, current control unit 37 (FIG. 2) is activated.

In controller 20 (FIG. 2), reference voltage generator 31 generates reference voltage VDr, and voltage detector 32 generates signal VDf indicative of a detection value of DC voltage VD. Subtractor 33 generates a deviation ΔVD=VDr−VD between reference voltage VDr and DC voltage VD indicated by output signal VDf of voltage detector 32, and voltage control unit 34 generates current command value Iir based on deviation ΔVD.

Subtractor 35 generates deviation ΔIi between current command value Iir and input current Ii of converter 7 which is indicated by output signal Iif of current detector 6 (FIG. 1), and current control unit 37 generates voltage command value Vic based on deviation ΔIi. PWM control unit 38 thus generates control signal CNT such that DC voltage VD attains to reference voltage VDr, thereby controlling converter 7.

DC power generated by converter 7 is stored in battery 22 through bidirectional chopper 8, reactor 9, and electromagnetic contactor 10 and is also converted into AC power of commercial frequency by inverter 12. The AC power generated by inverter 12 is supplied to load 23 through the low-pass filter including reactor 14 and capacitor 15, and electromagnetic contactor 16. Load 23 is driven by the AC power supplied from the uninterruptible power supply apparatus.

When supply of AC power from commercial AC power supply 21 is stopped, that is, when a power failure occurs, output signal φ41 of power failure detector 41 (FIG. 3) is lowed to "L" level. When signal φ41 is brought to "L" level, output signal EN1 of AND gate 43 is lowered to "L" level to deactivate PWM control unit 38 (FIG. 2), and the generation of control signal CNT is stopped, thereby stopping the operation of converter 7.

When signal φ41 is brought to "L" level, output signal φ45 of AND gate 45 (FIG. 3) is lowered to "L" level to turn off electromagnetic contactor 3, so that commercial AC power supply 21 and converter 7 are electrically separated from each other, and also, output signal EN2 of ON detector 46 is lowered to "L" level.

Meanwhile, DC power of battery 22 (FIG. 1) is supplied to inverter 12 by bidirectional chopper 8. Inverter 12 converts the DC power from bidirectional chopper 8 into AC power, and supplies the AC power to load 23. The operation of load 23 can thus be continued during a period in which DC power is stored in battery 22.

When inverter 12 fails in normal state of commercial AC power supply 21, semiconductor switch 17 (FIG. 1) is turned on instantaneously, electromagnetic contactor 16 is turned off, and electromagnetic contactor 18 is turned on. Thus, the AC power from commercial AC power supply 21 is supplied through semiconductor switch 17 and electromagnetic contactor 18 to load 23, and accordingly, the operation of load 23 is continued. Semiconductor switch 17 is turned off after a certain period of time, thus preventing damage to semiconductor switch 17 due to overheating.

In the present embodiment, as described above, converter 7 is controlled such that the frequency and phase of AC voltage VAF supplied from converter 7 to AC node N1 match the frequency and phase of AC voltage Vi supplied from commercial AC power supply 21, and then, electromagnetic contactor 3 is turned on. Electromagnetic contactor 3 is thus turned on with a decreased voltage between the first terminal and the second terminal of electromagnetic contactor 3, thus preventing damage to electromagnetic contactor 3 due to an overcurrent flowing through electromagnetic contactor 3.

The embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

T1 AC input terminal; T2 battery terminal; T3 AC output terminal; 1, 3, 10, 16, 18 electromagnetic contactor; 6, 13 current detector; 4, 11, 15 capacitor; 5, 9, 14 reactor; 7 converter; 8 bidirectional chopper; 2 inverter; 17 semiconductor switch; 19 operation unit; 20 controller; 21 commercial AC power supply; 22 battery; 23 load; 31 reference voltage generator; 32, 36 voltage detector; 33, 35 subtractor; 34 voltage control unit; 37 current control unit; 38 PWM control unit; 40 signal generation circuit; 41 power failure detector; 42 comparator; 43, 45 AND gate; 44 delay circuit; 46 ON detector; 47 determiner.

The invention claimed is:

1. A power converter comprising:
 a switch having
  a first terminal that receives a first AC voltage supplied from an AC power supply, and
  a second terminal connected to an AC input node;
 a capacitor that is connected to a DC node and stores DC power; an AC output node connected to an inversion unit output and an output supplying power to a load;
 a conversion unit that transmits and receives electric power between the AC input node and the DC node; and
 a controller, wherein
 in a first mode, the controller turns on the switch after controlling the conversion unit such that a frequency and a phase of a second AC voltage supplied from the conversion unit to the second terminal match a frequency and a phase of the first AC voltage supplied from the AC power supply to the first terminal supplied from the AC power supply to the first terminal, and
 in a second mode after the first mode, the controller controls the conversion unit such that a DC voltage supplied from the conversion unit to the DC node attains to a reference voltage.

2. The power converter according to claim 1, further comprising a preliminary charger that charges the capacitor to a predetermined DC voltage before execution of the first mode.

3. The power converter according to claim 1, further comprising the inversion unit that transmits and receives electric power between the DC node and the AC output node connected to a load, wherein in the second mode, the controller controls the inversion unit such that a frequency and a phase of a third AC voltage supplied from the inversion unit to the output node match the frequency and the phase of the first AC voltage.

4. The power converter according to claim 3, further comprising a switch circuit that receives the first and third AC voltages, supplies the third AC voltage to the load in normal operation of the inversion unit, and supplies the first AC voltage to the load in failure of the inversion unit.

5. The power converter according to claim 4, further comprising a bidirectional chopper that, in normal operation of the AC power supply, stores part of DC power generated by the conversion unit in a power storage device, and in power failure of the AC power supply, supplies the DC power of the power storage device to the inversion unit, wherein in failure of the AC power supply, the controller turns off the switch and controls the bidirectional chopper such that a DC voltage appearing at the DC node attains to the reference voltage.

* * * * *